US012718638B2

(12) United States Patent
Tabata et al.

(10) Patent No.: US 12,718,638 B2
(45) Date of Patent: Aug. 25, 2026

(54) INFORMATION PROCESSING DEVICE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Hideaki Bunazawa, Tokyo (JP); Yoshito Sekiguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/962,540

(22) Filed: Nov. 27, 2024

(65) Prior Publication Data

US 2025/0285479 A1 Sep. 11, 2025

(30) Foreign Application Priority Data

Mar. 5, 2024 (JP) ................................ 2024-033046

(51) Int. Cl.
*G07C 5/00* (2006.01)
*G07C 5/10* (2006.01)

(52) U.S. Cl.
CPC .................................... *G07C 5/10* (2013.01)

(58) Field of Classification Search
CPC ....................................................... G07C 5/10
See application file for complete search history.

(56) References Cited

U.S. PATENT DOCUMENTS

2014/0365029 A1* 12/2014 Sugimoto ............ G08G 1/0112 701/1
2021/0148418 A1* 5/2021 Kamio ..................... B60K 6/48

FOREIGN PATENT DOCUMENTS

JP 2008-108247 A 5/2008

* cited by examiner

*Primary Examiner* — Aaron G Cain
(74) *Attorney, Agent, or Firm* — SoraIP, Inc.

(57) ABSTRACT

The processing device of the information processing device includes: a first step of calculating a relative frequency distribution of the original data; a second step of setting a plurality of time windows for clipping data of a part of the period of the original data; a third step of clipping data from the original data; a fourth step of calculating a relative frequency distribution in the extracted data; and a fifth step of calculating an error between the relative frequency distribution in the original data and the relative frequency distribution in the extracted data; and a search process of repeatedly performing the trial from the second step to the fifth step by changing the setting of the plurality of time windows, and calculating an index value of damage to the engine-disconnecting clutch using the extracted data whose error is equal to or less than the threshold value.

5 Claims, 5 Drawing Sheets

INFORMATION PROCESSING DEVICE

CROSS-REFERENCE TO RELATED APPLICATION

This application claims priority to Japanese Patent Application No. 2024-033046 filed on Mar. 5, 2024, incorporated herein by reference in its entirety.

BACKGROUND

1. Technical Field

The present disclosure relates to information processing devices.

2. Description of Related Art

Japanese Unexamined Patent Application Publication No. 2008-108247 (JP 2008-108247 A) discloses an information processing device that reduces the size of data for analysis by compressing original data for analysis. The original data for analysis is data collected over a predetermined period using sensors mounted on a vehicle.

The information processing device disclosed in JP 2008-108247 A compresses data by extracting, from the original data, data acquired at the time when a certain vehicle speed is reached and data acquired at the time of an inflection point of the vehicle speed.

SUMMARY

The above information processing device extracts data by focusing only on the vehicle speed. Therefore, the above information processing device cannot extract data according to characteristics of data other than the vehicle speed. There is a demand for an information processing device that can obtain extracted data capturing characteristics of the entire original data including features other than the vehicle speed.

An information processing device for solving the above issue is an information processing device that acquires original data collected and created over a predetermined period using a plurality of sensors mounted on a vehicle and calculates an index value indicating a magnitude of damage accumulated in an engine-disconnecting clutch.

The information processing device includes a processing device configured to perform a process.

The original data includes, as features, the number of engagements of the engine-disconnecting clutch and a relative rotational speed between an input shaft and an output shaft of the engine-disconnecting clutch when the engine-disconnecting clutch is engaged.

In the information processing device, a search process that is performed by the processing device includes a first step of calculating, for each of the features included in the original data, a relative frequency distribution in the original data.

The search process includes a second step of setting a plurality of time windows for clipping data of a partial period of the original data in such a manner that a sum of periods of all the time windows is shorter than the predetermined period.

The search process includes a third step of clipping data from the original data according to the time windows.

The search process includes a fourth step of calculating, for each of the features, the relative frequency distribution in extracted data obtained by combining all the data clipped according to the time windows.

The search process includes a fifth step of calculating an error between the relative frequency distribution in the original data and the relative frequency distribution in the extracted data. In the search process, after the first step is performed, a trial from the second step to the fifth step is repeatedly performed by changing settings of the time windows. The processing device is configured to perform the search process to extract the extracted data with the error equal to or less than a threshold value.

The processing device is configured to calculate the index value using the extracted data with the error equal to or less than the threshold value.

In one aspect of the information processing device, the processing device may be configured to perform clustering. The clustering may be machine learning that groups data of each interval obtained by dividing the original data into intervals of a certain period into a predetermined number of clusters.

The processing device may be configured to set, in the second step, the time windows in such a manner that a difference between a proportion of each of the clusters in the extracted data and a proportion of each of the clusters in the entire original data is equal to or less than a threshold value.

The above information processing device can calculate the index value using the extracted data, namely the data whose data volume is smaller than that of the original data, with the same accuracy as in the case where the original data is used. Therefore, this information processing device can reduce the data volume while maintaining the accuracy, and can calculate the index value in a shorter time than in the case where the original data is used.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Information Processing System

Hereinafter, a data center 500, which is an embodiment of an information processing device, will be described referring to FIG. 1 to FIG. 5C.

Figure 1:
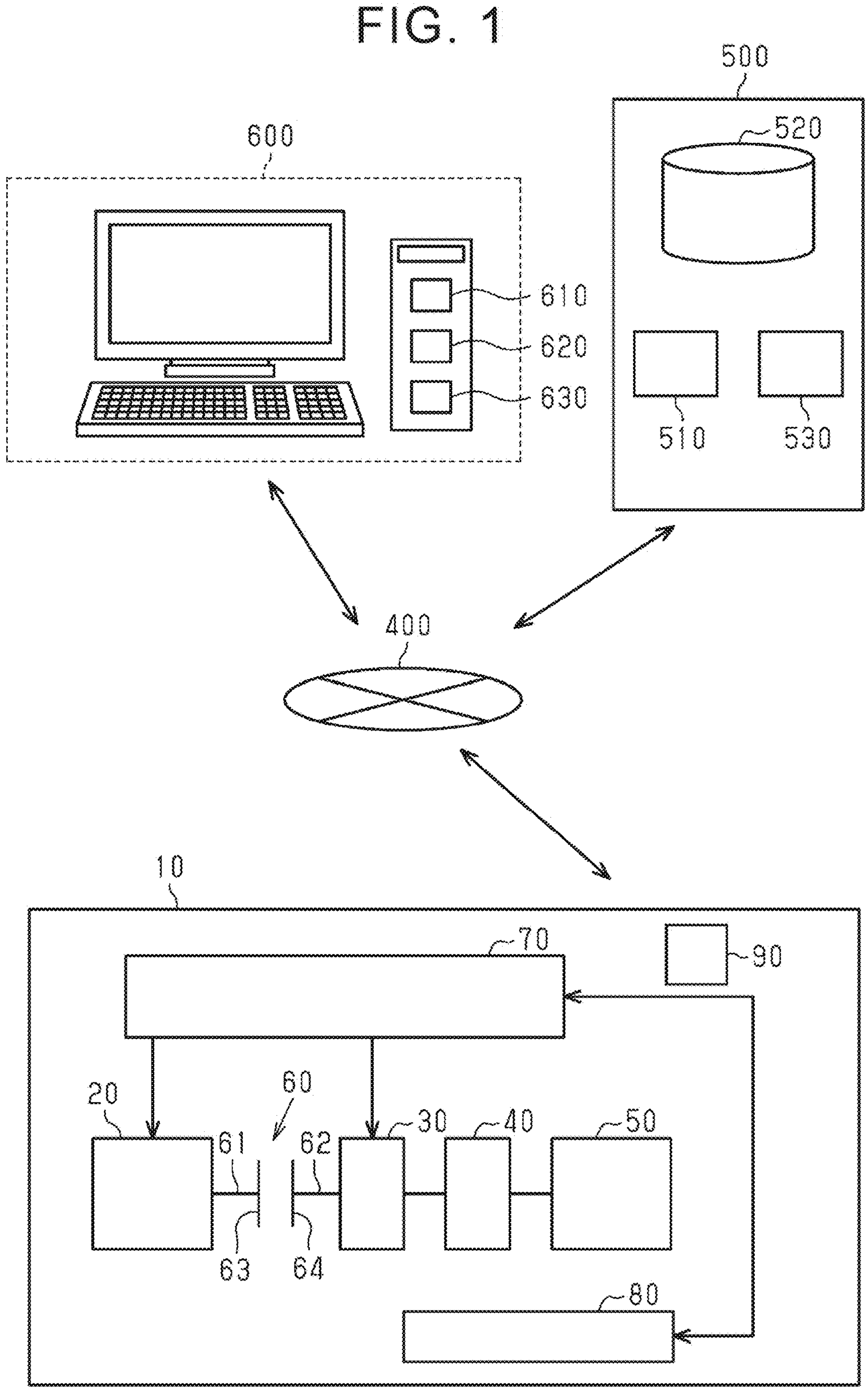
FIG. 1 is a schematic diagram illustrating a relationship between a data center, a vehicle, and an information processing terminal, which is an embodiment of an information processing device.

FIG. 1 shows a configuration of an information processing system including a data center 500. As shown in FIG. 1, the data center 500 communicates with the vehicle 10 via a communication network 400. The data center 500 also communicates with the information processing terminal 600 via the communication network 400. The data center 500 communicates with the plurality of vehicles 10 and the plurality of information processing terminals 600 via the communication network 400.

Configuration of the Data Center 500

As illustrated in FIG. 1, the data center 500 includes a processing device 510. The data center 500 includes a storage device 520 and a communication device 530. The processing device 510 includes a CPU that performs processing in accordance with a program, and a ROM in which the program is stored. The storage device 520 stores a large amount of data. The communication device 530 is implemented as hardware such as a network adapter, various communication software, or a combination thereof. The communication device 530 realizes wired or wireless communication via the communication network 400.

Configuration of the Vehicle 10

The data center 500 may be configured using a plurality of computers. For example, the data center 500 may be configured by a plurality of server apparatuses.

Each of the plurality of vehicles 10 includes a communication device 90. The communication devices 90 are implemented as hardware such as a network adapter, various types of communication software, or a combination thereof. The communication devices 90 are configured to realize wired or wireless communication via the communication network 400.

Each vehicle 10 includes an engine 20, a motor 30, a torque converter 40, and an automatic transmission 50. The output shaft of the engine 20 and the output shaft of the motor 30 are connected to the torque converter 40. Torque of the engine 20 and the motor 30 is transmitted to the torque converter 40. The torque transmitted to the torque converter 40 is transmitted to the automatic transmission 50. The vehicle 10 is driven by the automatic transmission 50 transmitting the torque of the engine 20 and the motor 30 to the drive wheels of the vehicle 10. The torque converter 40 and the automatic transmission 50 are operated by the hydraulic pressure of the hydraulic oil.

Each vehicle 10 includes an engine-disconnecting clutch 60. The engine-disconnecting clutch 60 functions as a clutch for disconnecting the engine 20 from the torque transmission path of the vehicle 10. The engine-disconnecting clutch 60 includes an input shaft 61 to which the rotation of the engine 20 is input, and an output shaft 62 which outputs the rotation of the engine 20. The input shaft 61 rotates integrally with the output shaft of the engine 20. The output shaft 62 rotates integrally with the output shaft of the motor 30. The torque of the engine 20 is transmitted to the torque converter 40 via the input shaft 61 and the output shaft 62. The torque of the motor 30 is transmitted to the torque converter 40 via the output shaft 62.

The engine-disconnecting clutch 60 includes an input engagement member 63 coupled to the input shaft 61 and an output engagement member 64 coupled to the output shaft 62. The output engagement member 64 is configured to be engageable with the input engagement member 63. When the output engagement member 64 engages with the input engagement member 63, rotation is transmitted between the input shaft 61 and the output shaft 62.

For example, when the input engagement member 63 and the output engagement member 64 are pressed against each other, a frictional force is generated between the input engagement member 63 and the output engagement member 64. By adjusting the frictional force, the operating state of the engine-disconnecting clutch 60 is switched. The operation state of the engine-disconnecting clutch 60 is switched by, for example, adjusting the frictional force between the input engagement member 63 and the output engagement member 64 by the hydraulic pressure of the hydraulic oil. The operating state of the engine-disconnecting clutch 60 includes a first engaged state, a second engaged state, and a disengaged state.

The first engaged state is a state in which rotation is transmitted between the input engagement member 63 and the output engagement member 64 without the output engagement member 64 slipping with respect to the input engagement member 63. In the first engaged state, the output engagement member 64 rotates integrally with the input engagement member 63. In the first engaged state, a slight relative rotation may be allowed between the output engagement member 64 and the input engagement member 63.

The second engaged state is a state in which rotation is transmitted between the input engagement member 63 and the output engagement member 64 while the output engagement member 64 slips with respect to the input engagement member 63. In the second engaged state, the rotational speed of the output engagement member 64 is different from the rotational speed of the input engagement member 63.

The disconnected state is a state in which no rotation is transmitted between the input engagement member 63 and the output engagement member 64. In the disconnected state, the input engagement member 63 is not engaged with the output engagement member 64, so that the transmission of torque between the engine 20 and the motor 30 is interrupted.

The vehicle 10 includes a control device 70. The control device 70 controls the engine 20 and the motor 30. The control device 70 controls the output torque of the engine 20 by controlling the throttle actuator, the fuel injection device, the ignition device, and the like of the engine 20. The control device 70 controls the output torque of the motor 30 by controlling an inverter circuit provided between the motor 30 and the battery of the vehicle 10.

The vehicle 10 includes a hydraulic control circuit 80. The hydraulic control circuit 80 can change the hydraulic pressure of the hydraulic oil supplied to the engine-disconnecting clutch 60. The control device 70 controls the hydraulic control circuit 80. The control device 70 switches the operating state of the engine-disconnecting clutch 60 by changing the hydraulic pressure of the hydraulic oil supplied to the engine-disconnecting clutch 60. The hydraulic control circuit 80 may further be capable of changing the hydraulic pressure of the hydraulic oil supplied to the torque converter 40 and the automatic transmission 50. The control device 70 controls the torque converter 40 and the automatic transmission 50 by changing the hydraulic pressure of the hydraulic oil supplied to the torque converter 40 and the automatic transmission 50.

The control device 70 is equipped with various sensors that collect information of each unit of the vehicle 10.

In each vehicle 10, travel data is collected from the various sensors. The traveling data is transmitted from each vehicle 10 to the data center 500 by the communication device 90. For example, travel data including the travel distance, the position information, and the vehicle speed of each vehicle 10 is transmitted from each vehicle 10 to the data center 500. Identification information for identifying the respective vehicles 10 is also transmitted from the respective vehicles 10 to the data center 500 together with the traveling data.

The data center 500 stores the traveling data together with the received identification information in the storage device 520. In this way, traveling data of the plurality of vehicles 10 is accumulated in the storage device 520 of the data center 500.

Configuration of the Information Processing Terminal 600

The information processing terminal 600 includes a processing device 610, a storage device 620, and a communication device 630. The processing device 610 includes a CPU that performs processing in accordance with a program, and a ROM in which the program is stored. The storage device 620 stores data. The communication device 630 is implemented as hardware such as a network adapter, various communication software, or a combination thereof. The communication device 630 realizes wired or wireless communication via the communication network 400. The information processing terminal 600 is, for example, a personal computer.

Analysis of Travel Data of the Vehicle 10

The information processing terminal 600 is used to analyze travel data. When analyzing the traveling data, an instruction for performing the analysis is transmitted from the information processing terminal 600 to the data center 500. The processing device 510 of the data center 500 that has received the instruction performs analysis using a part of travel data among the enormous travel data stored in the storage device 520 of the data center 500. The travel data to be used is selected from the enormous amount of travel data stored in the storage device 520 in accordance with the purpose of analysis.

For example, the processing device 510 calculates a load applied to a specific component of the specific vehicle 10 based on travel data of the specific vehicle 10. The processing device 510 estimates the damage accumulated in the component based on the calculated load. For example, the processing device 510 calculates an index value indicating the magnitude of the damage accumulated in the engine-disconnecting clutch 60 of the specific vehicle 10 based on the traveling data of the specific vehicle 10. The processing device 510 of the data center 500 outputs the calculated result by transmitting the calculated result to the information processing terminal 600. The information processing terminal 600 that has received the result displays the received result.

In order to perform such an analysis, the processing device 510 analyzes a large amount of travel data collected over a long period of time. Since the processing device 510 needs to perform an enormous amount of computation, it takes a long time to analyze.

Therefore, it is conceivable to extract the extracted data that captures the features of the entire original data from a large amount of travel data that is the original data. If such extracted data can be extracted, the processing device 510 can perform analysis in a shorter time by using the extracted data. For example, in the case of estimating the damage of the engine-disconnecting clutch 60 when the vehicle travels for 100,000 hours, the processing device 510 estimates the damage using the extracted data for 20,000 hours extracted from the original data for 100,000 hours. Then, the processing device 510 multiplies the index value calculated from the extracted data for 20,000 hours by 5 to calculate the index value of the damage of the engine-disconnecting clutch 60 when the vehicle travels for 100,000 hours.

Figure 2:
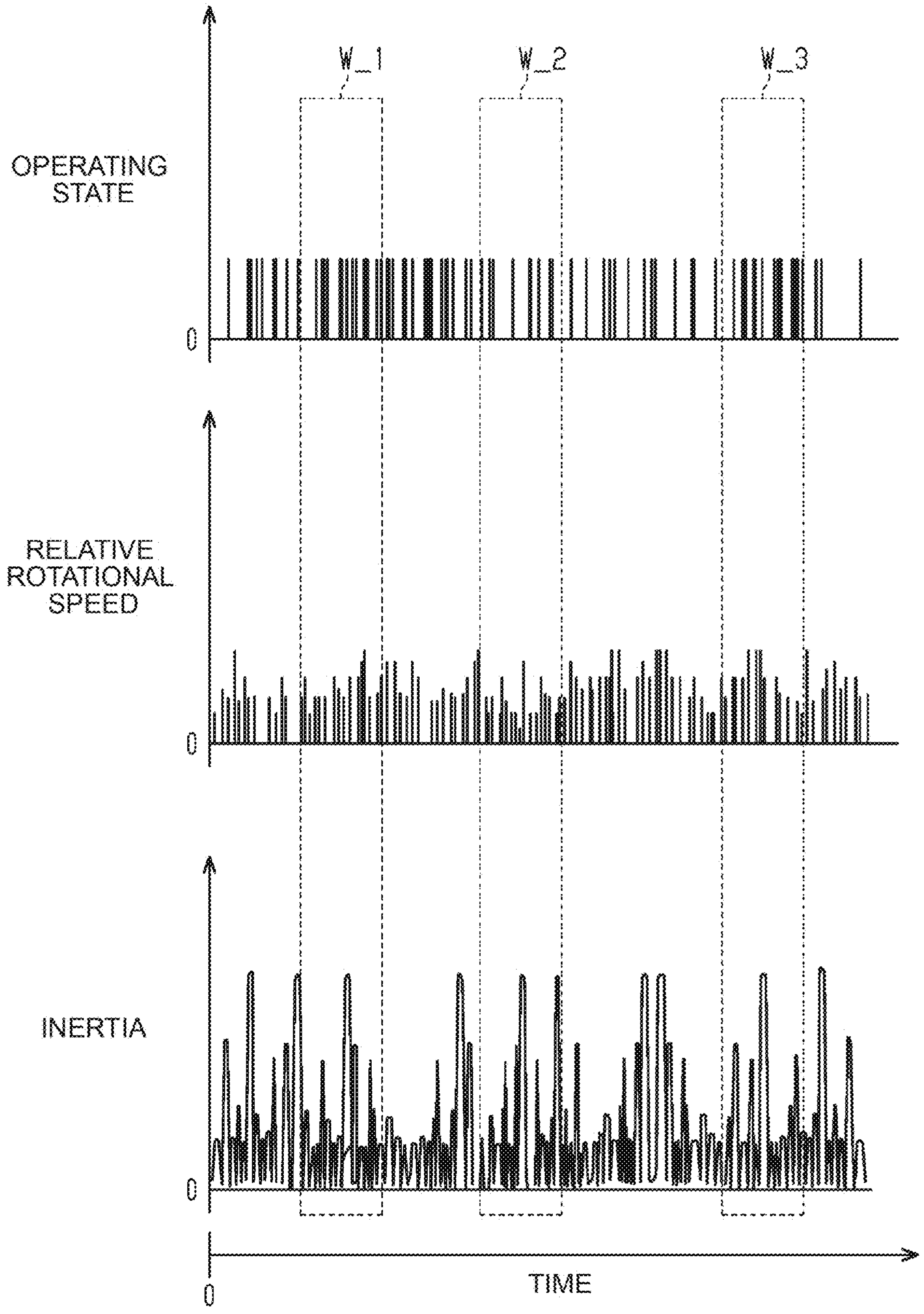
FIG. 2 is a graph showing the original data, the upper figure showing a change in operating state of the engine-disconnecting clutch, the middle figure showing the relative rotational speed of the engine-disconnecting clutch, and the lower figure showing the transition of the inertia of the engine.

FIG. 2 illustrates an example of original data. The original data is travel data for 100,000 hours in one vehicle 10. FIG. 2 shows a part of original data which is travel data for 100,000 hours. The original data illustrated in FIG. 2 includes, as the feature, data of the number of engagements, the relative rotational speed, and the inertia of the engine-disconnecting clutch 60 to be subjected to calculation of the index value of damage.

The upper view of FIG. 2 shows a change in operating state of the engine-disconnecting clutch 60. In the upper view of FIG. 2, a state where the operating state of the engine-disconnecting clutch 60 is the open state is indicated by "0", and a state where the operating state of the engine-disconnecting clutch 60 is the first engaged state or the second engaged state is indicated by "1". The number of engagements of the engine-disconnecting clutch 60 as the feature is the number of times that the operating state of the engine-disconnecting clutch 60 is in the first engaged state or the second engaged state in a predetermined period of time. The control device 70 calculates the number of engagements from the change in operating state of the engine-disconnecting clutch 60. Data of the operating state of the engine-disconnecting clutch 60 may be transmitted from the vehicle 10 to the data center 500, and the number of engagements may be calculated by the data center 500.

FIG. 2 shows a change in relative rotational speed. The relative rotational speed as the feature is the relative rotational speed between the input shaft 61 and the output shaft 62 of the engine disconnecting clutch 60 when the engine-disconnecting clutch 60 is engaged. The expression "when the engine-disconnecting clutch 60 is engaged" means when the operating state of the engine-disconnecting clutch 60 changes from the disconnected state to the first engaged state or the second engaged state. The control device 70 acquires the relative rotational speed from the rotational speed of the output shaft of the engine 20 and the rotational speed of the output shaft of the motor 30. From the vehicle 10, data of the number of revolutions of the output shaft of the engine 20 and the number of revolutions of the output shaft of the motor 30 may be transmitted to the data center 500, and the relative rotational speed may be calculated in the data center 500.

The number of engagements and the relative rotational speed are correlated with the damage of the engine-disconnecting clutch 60 of the vehicle 10. The processing device 510 of the data center 500 estimates the damage of the engine-disconnecting clutch 60 from the travel data including the number of engagements and the relative rotational speed as the feature.

The lower figure of FIG. 2 shows the change in inertia for 100,000 hours. The inertia as the feature is the inertia of the engine 20 that outputs the rotational force to the engine-disconnecting clutch 60. The control device 70 calculates inertia from the number of revolutions of the output shaft of the engine 20 when the operating state of the engine-disconnecting clutch 60 changes from the open state to the first engaged state or the second engaged state. From the vehicle 10, data of the rotational speed of the output shaft of the engine 20 when the operating state of the engine-disconnecting clutch 60 becomes the first engaged state or the second engaged state may be transmitted to the data center 500, and inertia may be calculated in the data center 500.

The temperature of the engine 20 may be further used to calculate the inertia of the engine 20. When the temperature of the engine 20 is low, the viscosity of the engine oil increases, and the inertia of the engine 20 increases. The control device 70 calculates the inertia larger as the temperature of the engine 20 is lower.

The inertia of the engine 20 correlates with the damage of the engine-disconnecting clutch 60 of the vehicle 10. The processing device 510 of the data center 500 estimates the damage of the engine-disconnecting clutch 60 from the travel data including inertia in addition to the number of engagements and the relative rotational speed as the feature.

The extracted data is created by clipping the data from the original data by a plurality of time windows. In FIG. 2, as an example of a part of the plurality of time windows, three time windows of the first time window W_1, the second time window W_2, and the third time window W_3 are indicated by broken lines. The beginning and end of each time window are set such that the respective time windows do not overlap. In this example, the traveling data for 20,000 hours is clipped as the extracted data. Therefore, the start and end periods of each time window are set so that the total length of the time periods of all the time windows is 20,000 hours.

The data center 500 searches for the setting of the start time and the end time of each time window indicating the clipping pattern for extracting the extracted data that captures the features of the entire original data.

The data center 500 extracts the extracted data from the original data by using the clipping pattern found by the search. The data center 500 performs analysis using the extracted data.

Clipping Pattern Search Process

Figure 3:
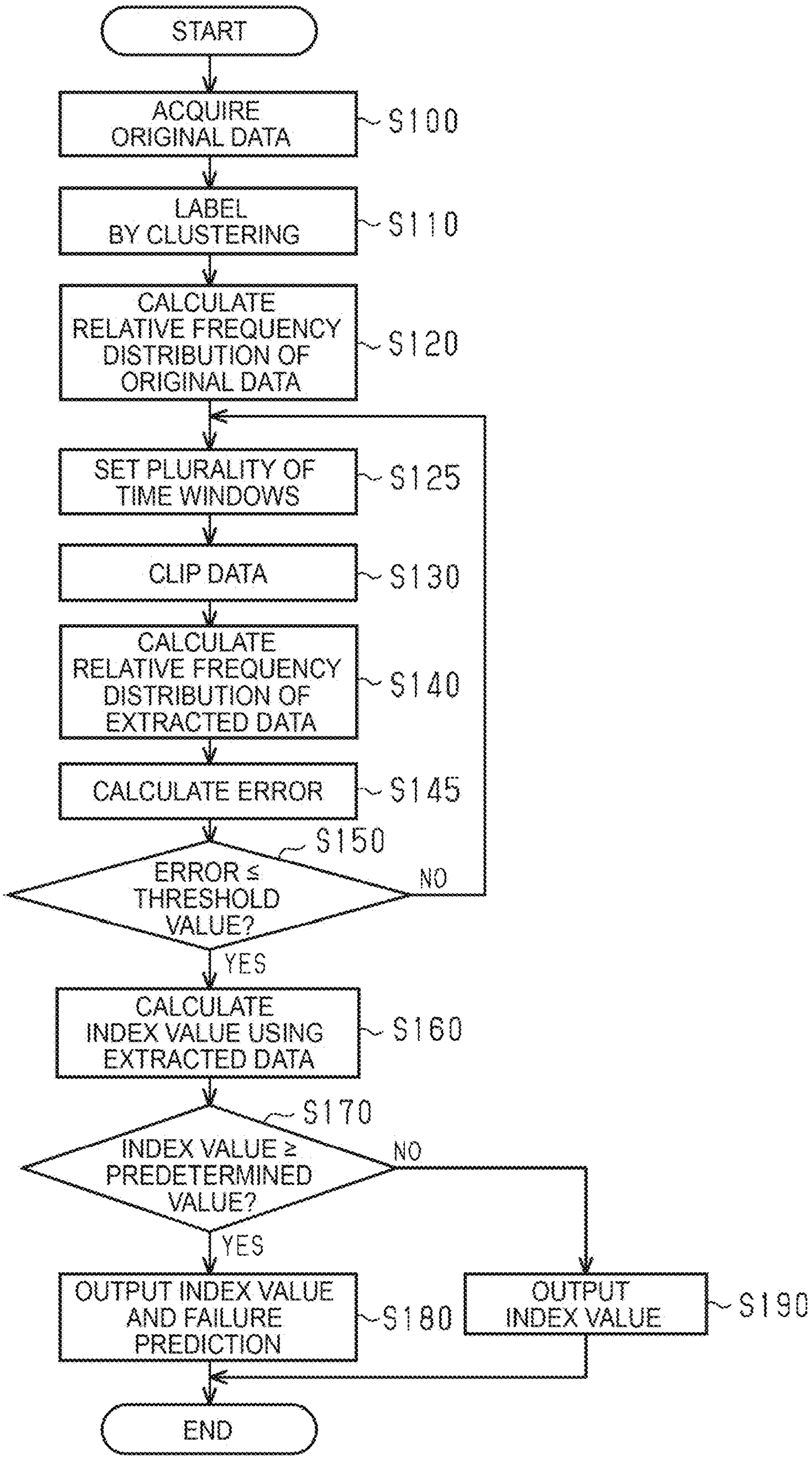
FIG. 3 is a flowchart illustrating a flow of processing performed by the processing device of the data center.

FIG. 3 is a flowchart illustrating a flow of a series of processes related to the clipping pattern search process. This series of processing is performed by the processing device 510 of the data center 500.

As illustrated in FIG. 3, the processing device 510 acquires the original data in the processing of S100. The original data is a part of the travel data selected for the purpose of analysis from the enormous travel data stored in the storage device 520 of the data center 500. For example, the original data for calculating the index value indicating the magnitude of the damage accumulated in the engine-disconnecting clutch 60 of one vehicle 10 is travel data for a predetermined period of the target vehicle 10 selected from the huge travel data of the plurality of vehicles 10. For example, in the case of estimating the damage of the engine-disconnecting clutch 60 when traveling for 100,000 hours, the original data is traveling data over a predetermined period of the target vehicle 10.

In S110 process, the processing device 510 labels the original data by clustering. Specifically, the processing device 510 divides the original data at regular intervals. The length of the period for separating the original data is, for example, several minutes. Then, the processing device 510 performs clustering which is machine learning for classifying the data of each interval into a predetermined number of clusters. For example, k-means method is used as the algorithm of clustering. k-means method is a clustering algorithm for classifying data into a predetermined number of clusters. The clustering algorithm is not limited to k-means method.

The original data includes travel data collected under different environments, such as travel data when traveling in an urban area, travel data when traveling in a suburban area, and travel data when traveling on an expressway. By performing clustering, the travel data included in the original data can be classified into clusters of travel data having similar characteristics. The number of clusters to be classified is arbitrarily set according to the contents of the analysis.

Figure 4:
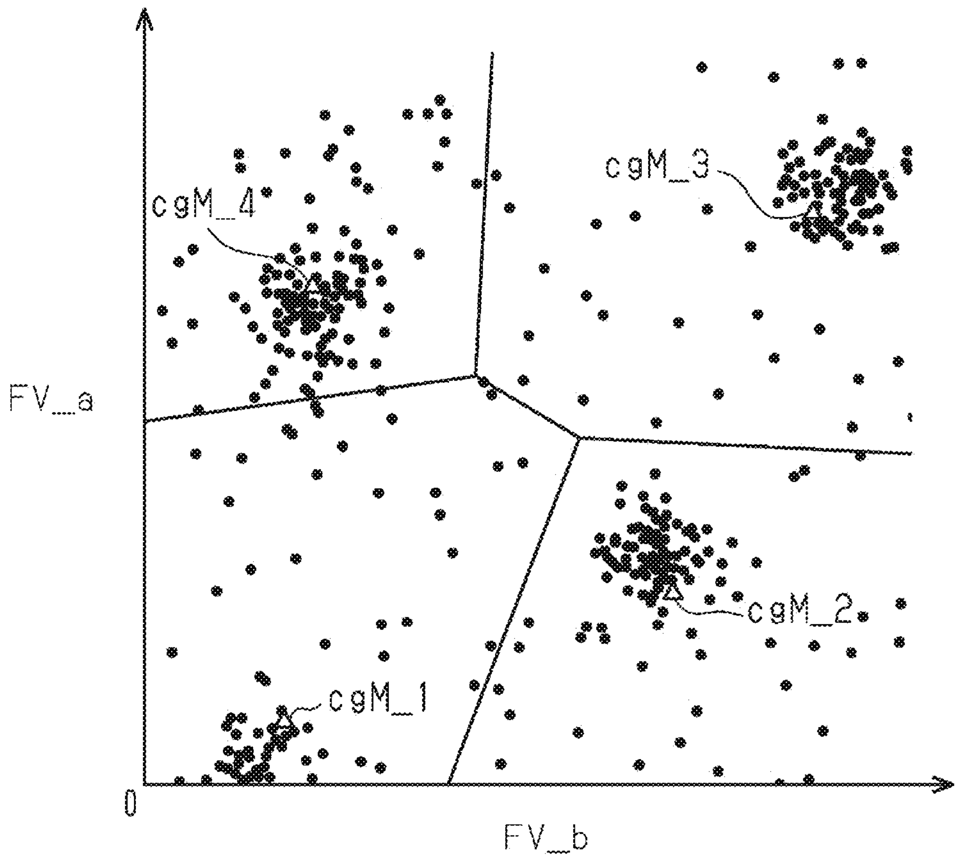
FIG. 4 is the graph which showed an example which clustered the original data using two features.

FIG. 4 is a graph illustrating an exemplary clustering of original data into four clusters by a k-means method using two features included in the original data as explanatory variables. For example, the two features are the number of engagements and the relative rotational speed. In FIG. 4, each piece of data in each interval partitioned from the original data is indicated by a single point. When performing clustering, the processing device 510 uses a representative value of an explanatory variable in the data of each interval. For example, the processing device 510 sets the average value of the features in the data of each interval as a representative value. The processing device 510 may use, as the representative value, the moving average value of the features in a plurality of consecutive intervals in time series.

In FIG. 4, these points are shown in a two-dimensional space with the first feature FV_a and the second feature FV_b as coordinate axes. FIG. 4 is an example in which original data is clustered in four clusters of the first cluster M_1, the second cluster M_2, the third cluster M_3, and the fourth cluster M_4. In FIG. 4, the boundaries of the four clusters are indicated by solid lines. In FIG. 4, the center of gravity of each cluster is indicated by an open triangle. The center of gravity cgM_1 is the center of gravity of the first cluster M_1. The center of gravity cgM_2 is the center of gravity of the second cluster M_2. The center of gravity cgM_3 is the center of gravity of the third cluster M_3. The center of gravity cgM_4 is the center of gravity of the fourth cluster M_4.

Although FIG. 4 shows two examples of explanatory variables, the number of explanatory variables is not limited to two. For example, when the original data includes three features, the processing device 510 may perform clustering using these three features as explanatory variables. In this case, the processing device 510 clusters the original data in the three-dimensional space.

The processing device 510 assigns a label indicating the result of the clustering in this way to the original data. Specifically, each data indicated by a point in the coordinate space is given a label for identifying a cluster in which the data is classified. In this way, the processing device 510 creates the original data to which the label is attached.

Next, the processing device 510 calculates the relative frequency distribution of the original-data in the processing of S120. When a plurality of features is included in the original data, the processing device 510 calculates a relative frequency distribution in the original data for each feature.

The frequency distribution classifies data into a plurality of classes, and represents a frequency distribution that is the number of data of each class. The relative frequency indicates how much the frequency of the class accounts for the sum of the total frequencies.

Figure 5A:
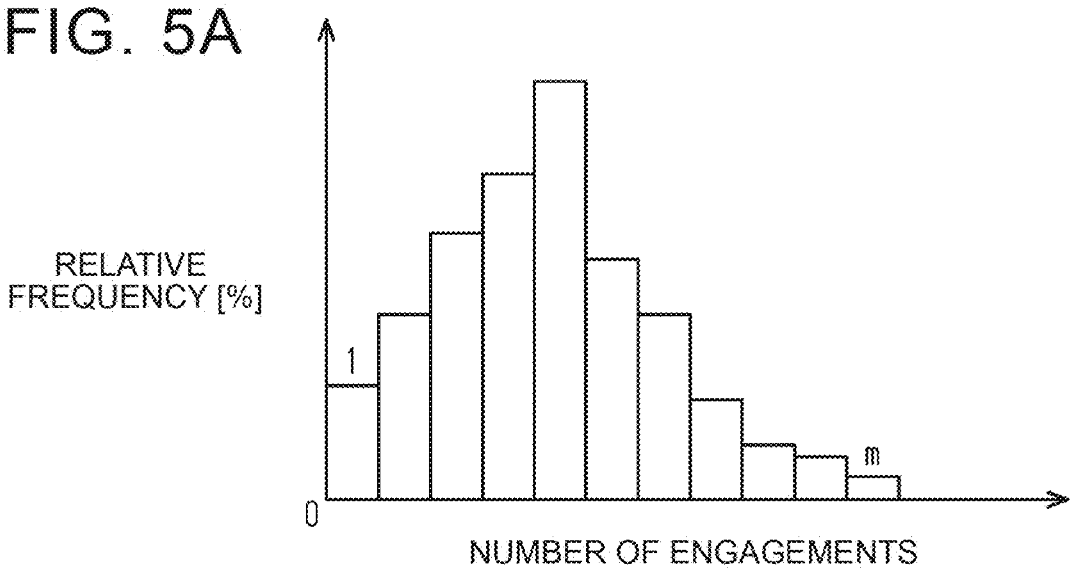
FIG. 5A shows an example of the relative frequency distribution in the original data, and it shows an example of the relative frequency distribution for the number of engagements of the engine-disconnecting clutch.

FIG. 5A shows the relative frequency distribution for the number of engagements in the original data shown in FIG. 2. In this relative frequency distribution, the rank of the number of engagements in the original data is divided into m ranks from 1 to m, and the relative frequency distribution is shown.

Figure 5B:
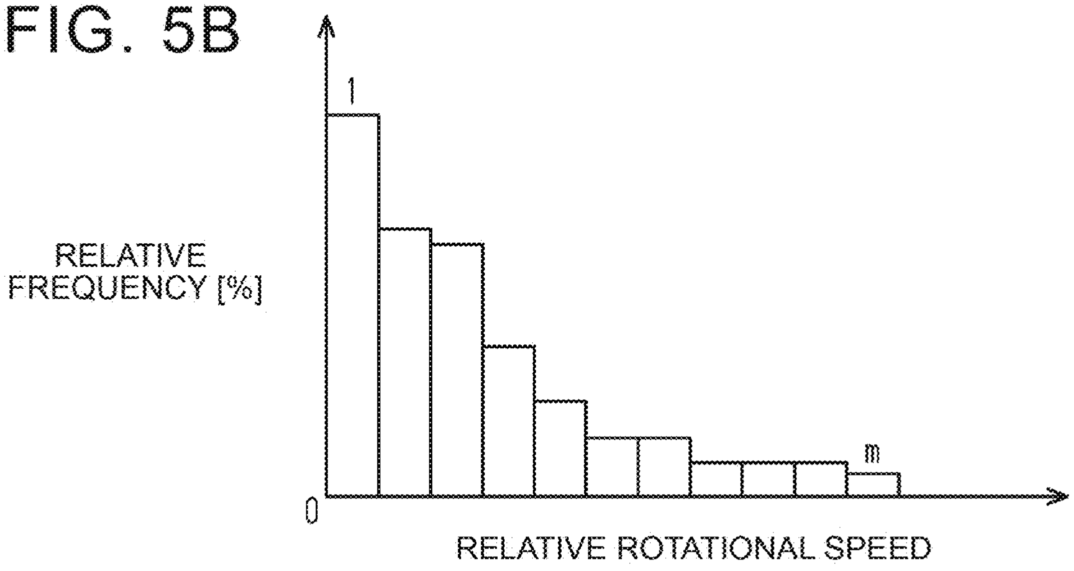
FIG. 5B shows an example of the relative frequency distribution in the original data, and it shows an example of the relative frequency distribution for the relative rotational speed of the engine-disconnecting clutch.

FIG. 5B shows the relative frequency distribution for the relative rotational speed in the original-data shown in FIG. 2. In this relative frequency distribution, the relative frequency distribution is shown by dividing the class of the relative rotational speed in the original data into m classes from 1 to m.

Figure 5C:
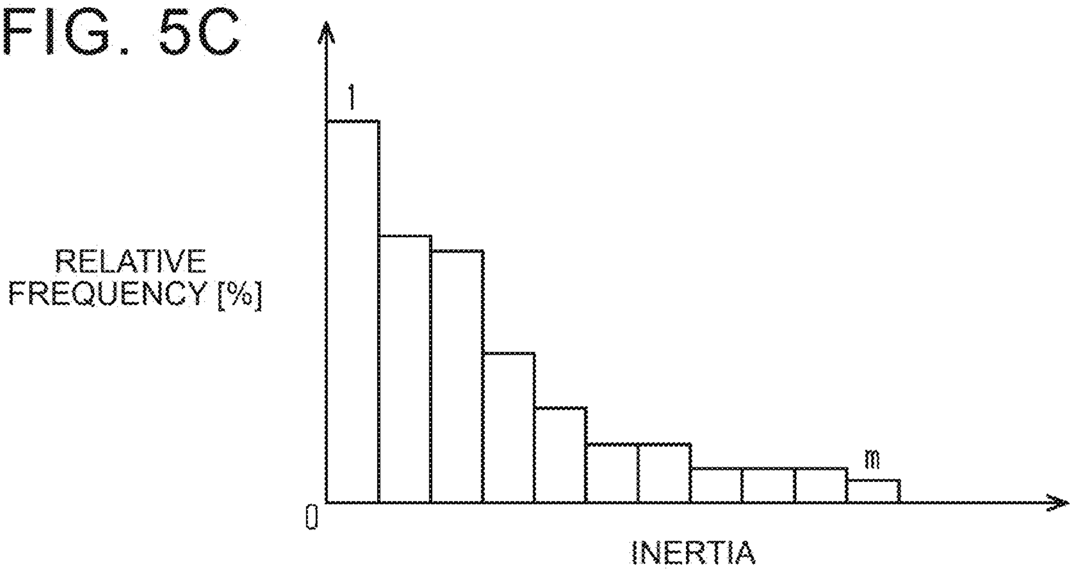
FIG. 5C shows an example of the relative frequency distribution in the original data. It shows an example of the relative frequency distribution for the inertia of the engine.

FIG. 5C shows the relative frequency distribution for inertia in the original data shown in FIG. 2. In this relative frequency distribution, the class of inertia in the original data is divided into m classes from 1 to m to show the relative frequency distribution.

In S120 process, the processing device 510 calculates the relative frequency distribution for the respective feature values included in the original data. The number of classes in the relative frequency distribution of each feature is the same.

Next, in S125 process, the processing device 510 sets a plurality of time windows in order to extract the extracted data from the original data.

In FIG. 2, three time windows W_1 to W_3 of the first time window W_1, the second time window W_2, and the third time window W_3 are shown as examples of a plurality of time windows. In the example shown in FIG. 2, the time periods of each time window are all equal. As illustrated in FIG. 2, the data clipped by each clipping window is data of a feature in the same period.

In S125 process, the processing device 510 randomly sets a plurality of time windows such that the total time period of all time windows is shorter than a predetermined period, which is the total time period of the original data. As will be described later, the processing device 510 combines all the data clipped by the plurality of time windows set here to generate extracted data. The total time period of all the time windows is a value for determining the capacity of the extracted data. Therefore, a period in which all the time windows are summed is set in advance.

For example, the processing device 510 randomly sets the number of time windows, the start of each time window, and the end of each time window each time S125 process is performed. At this time, the processing device 510 sets each time window so that each time window does not overlap. The processing device 510 thus randomly sets the plurality of time windows such that the total period of all time windows is a preset period. In S125 process, the processing device 510 may set a plurality of time windows by fixing the time periods of the time windows to be constant, as illustrated in FIG. 2. In S125 process, the processing device 510 may fix the plurality of time windows to a fixed number and set the plurality of time windows.

In addition to the above-described requirements, when setting a plurality of time windows through S125, the processing device 510 sets a plurality of time windows such that a difference between a proportion of each cluster in the extracted data and a proportion of each cluster in the entire original data is equal to or less than a threshold value.

In this way, by setting a plurality of time windows through S125 process, a clipping pattern in which data is clipped from the original data is determined. When the processing device 510 determines the clipping pattern in this way, the processing proceeds to S130.

In S130 process, the processing device 510 clips data from the original data in the determined clipping pattern. That is, in S130 process, the processing device 510 clips data from the original data by a plurality of set time windows. Then, the processing device 510 combines all the data clipped by the plurality of time windows to create extracted data.

In the process of the following S140, the processing device 510 calculates the relative frequency distribution of the extracted data. The processing device 510 calculates the relative frequency distribution of the extracted data in the same manner as the method of calculating the relative frequency distribution in S120. In other words, in S140 process, the processing device 510 calculates the relative frequency distribution of the extracted data for each feature value. At this time, the processing device 510 sets the number of grades in the relative frequency distribution of the respective features to be the same as the relative frequency distribution in S120.

Next, in S145 process, the processing device 510 calculates an error between the relative frequency distribution in the original data and the relative frequency distribution in the extracted data. For example, the processing device 510 calculates a mean absolute error MAE (Mean Absolute Error). The mean absolute error MAE is expressed by the following equation.

$$MAE = \frac{1}{n}\sum_{i=1}^{n}\sum_{j=1}^{m}|Y_{nm} - y_{nm}| \quad \text{Mathematical formula 1}$$

In the above equation, "n" is the number of features. "m" is the number of series in the relative frequency distribution. "Y" is the frequency of the corresponding feature in the original data in the corresponding class. "y" is the frequency of the corresponding feature in the extracted data in the corresponding class.

As shown in the above equation, the processing device 510 calculates, as an error, the sum of the errors of the frequencies in the respective classes for each feature between the relative frequency distribution in the entire original data and the relative frequency distribution in the extracted data.

After calculating the error, the processing device 510 advances the processing to S150. In S150 process, the processing device 510 determines whether or not the calculated error is less than or equal to the threshold value. The threshold value is a value for determining whether or not the extracted data having the relative frequency distribution close to the relative frequency distribution in the original data is extracted by the set clipping pattern. The magnitude of the threshold value is set in advance so that it can be determined that extracted data having a relative frequency distribution close to the relative frequency distribution in the original data is extracted based on the error being equal to or smaller than the threshold value.

In S150 process, when it is determined that the error is equal to or smaller than the threshold value (S150: YES), the processing device 510 advances the process to S160.

In S160 process, the processing device 510 calculates the target index value using the extracted data generated in the process of the latest S130. Here, an index value indicating the magnitude of the damage accumulated in the engine-disconnecting clutch 60 is calculated. For example, the processing device 510 calculates the degree of damage as an index value indicating the magnitude of damage accumulated in the engine-disconnecting clutch 60.

The degree of damage is an index value representing the ratio of damage accumulated, assuming that the damage of the engine-disconnecting clutch 60 gradually accumulates, assuming that the damage resulting in damage is "1". Here, the damage applied to the engine-disconnecting clutch 60 during a certain period of time is calculated based on the data of the number of engagements. In addition to the number of engagements, the damage applied to the engine-disconnecting clutch 60 from at least one of the relative rotational speed and the inertia may be calculated as the feature. Then, the degree of damage that the engine-disconnecting clutch 60 is damaged is set to "1", and the calculated ratio of damage is calculated as an index value. By repeating this process, the degree of damage, which is the ratio of accumulated damage to damage leading to damage, is calculated. When the degree of damage becomes “1”, the damage is caused, and the calculated degree of damage is a value from “0” to “1”.

Here, since the damage degree is calculated using the extracted data which is a part of the original data, the processing device 510 converts the calculated damage degree into a size corresponding to the original data, and calculates the damage degree as the index value. For example, when the original data is traveling data for 100,000 hours and the extracted data is traveling data for 20,000 hours, the calculated degree of damage is multiplied by 5 to obtain the degree of damage as the index value.

On the other hand, in S150 process, when it is determined that the error is larger than the threshold value (S150: NO), the processing device 510 returns the process to S125. Then, the processing device 510 performs the search processing up to S125 to S145 again.

In this way, the processing device 510 repeatedly performs S125 to S145 search processing by changing the settings of the plurality of time windows, and extracts extracted data in which the error becomes equal to or less than the threshold value from the original data. Then, the processing device 510 calculates an index value using the extracted data. After calculating the index value, the processing device 510 advances the processing to S170.

In S170 process, the processing device 510 determines whether or not the index value is equal to or greater than a predetermined value. The default value is a value for predicting that damage is more likely to occur based on the fact that the index value is equal to or larger than the default value. For example, “0.9” can be set here, for example, as a default value in the degree of damage. In this case, it is possible to predict that the possibility of the damage is high based on the fact that the damage has reached 90% of the damage leading to the damage.

In S170 process, when it is determined that the index value is equal to or greater than the predetermined value (S170: YES), the processing device 510 advances the process to S180. In S180 process, the processing device 510 outputs an index value and a failure estimate. Specifically, the processing device 510 transmits the index value and the failure prediction to the information processing terminal 600 that has transmitted the instruction for requesting the analysis.

The failure prediction is, for example, a message indicating that the occurrence of a failure has been predicted. In this way, when the calculated index value is equal to or greater than the predetermined value, the processing device 510 notifies that the occurrence of the failure has been predicted. The failure prediction may be information of a lifetime until a failure occurs. For example, when the degree of damage calculated by using the extracted data extracted from the original data for 100,000 hours is the index value, the processing device 510 calculates the traveling time until the degree of damage reaches “1” and outputs the calculated traveling time as the information of the life. The information on the life may be converted into the traveling distance based on the traveling distance of 100,000 hours and output.

In S170 process, when it is determined that the index value is less than the predetermined value (S170: NO), the processing device 510 advances the process to S190. In S190 process, the processing device 510 outputs an index value. Specifically, the processing device 510 transmits the index value to the information processing terminal 600 that has transmitted the instruction for requesting the analysis.

Operation of this Embodiment

When S180 or S190 process is performed, the processing device 510 terminates the series of processes.

The data center 500, which is the information processing device of the present embodiment, acquires original data collected and created over a predetermined period using a plurality of sensors mounted on the vehicle 10, and calculates an index value indicating the magnitude of damage accumulated in the engine-disconnecting clutch 60.

The data center 500 includes a processing device 510 that performs processing. The original data includes data of the number of engagements and the relative rotational speed of the engine-disconnecting clutch 60 as the feature. The original data further includes inertia data as a feature in addition to the number of engagements and the relative rotational speed. In the data center 500, the search process performed by the processing device 510 includes a first step (S120) of calculating, for each feature, a relative frequency distribution in the original data for a plurality of features included in the original data. The searching process includes a second step (S125) of setting a plurality of time windows for clipping data of a part of the period of the original data such that the period of time of all the time windows is less than the predetermined period of time. The search process includes a third step (S130) of clipping data from the original data by a plurality of time windows. The search process includes a fourth step (S140) of calculating, for each feature, the relative frequency distribution in the extracted data obtained by combining all the data clipped by the plurality of time windows. The search process includes a fifth step (S145) of calculating an error between the relative frequency distribution in the original data and the relative frequency distribution in the extracted data. After performing the first step, the processing device 510 performs a search process in which a trial from the second step to the fifth step are repeatedly performed by changing the settings of a plurality of time windows. Then, the processing device 510 extracts the extracted data in which the error is equal to or less than the threshold value (S150: YES). The processing device 510 calculates an index value using the extracted data in which the error becomes equal to or smaller than the threshold value (S160).

According to the data center 500, it is possible to obtain extracted data in which features of the entire original data including a plurality of features are captured. Therefore, the data center 500 can calculate the index value with the same accuracy as in the case of using the original data by using the extracted data having a smaller data amount than the original data.

Effect of this Embodiment (1) According to the data center 500 that is the information processing device of the present embodiment, it is possible to achieve both reduction in the amount of data and calculation accuracy of the index value.

(2) According to the data center 500 which is the information processing device of the present embodiment, it is possible to calculate the index value in a shorter time than in the case where the original data is used.

(3) The processing device 510 performs clustering, which is machine learning for classifying the data of the sections obtained by dividing the original data into a predetermined number of clusters at regular intervals (S110). Then, in the second step (S125) of the search process, the processing device 510 sets a plurality of time windows such that the difference between the proportion of each cluster in the extracted data and the proportion of each cluster in the entire original data is equal to or less than the threshold value.

A plurality of sections classified into the same cluster are intervals having similar characteristics. In the above-described search process, the setting output from the processing device 510 is a setting in which the difference between the proportion of the entire original data and each cluster is equal to or less than the threshold value, and the extracted data having the relative frequency distribution of each feature close to each other can be clipped.

Therefore, according to the search process performed by the data center 500, it is possible to find a setting that can obtain extracted data closer to the characteristics of the entire original data.

(4) The processing device 510 terminates the search process when one piece of extracted data whose error becomes equal to or smaller than the threshold value can be extracted, and calculates an index value using the extracted data whose error becomes equal to or smaller than the threshold value. Therefore, the data center 500 can calculate an index value at a time point when one piece of extracted data whose error becomes equal to or smaller than the threshold value can be extracted, and output the result promptly.

(5) When the calculated index value is equal to or greater than the predetermined value (S170: YES), the processing device 510 notifies that a failure has been predicted. Therefore, the data center 500 can notify the user that the occurrence of the failure has been predicted before the failure occurs.

(6) The processing device 510 calculates a degree of damage as an index value. Therefore, the data center 500 can inform the user of how long the delay until the failure is reached.

Example of Change

The present embodiment can be modified to be implemented as follows. The present embodiment and modifications described below may be carried out in combination within a technically consistent range.

Although the number of engagements of the engine-disconnecting clutch 60 to be subjected to calculation of the index value of damage, the relative rotational speed of the engine-disconnecting clutch 60, and the inertia of the engine 20 have been exemplified as the feature, the index value may be calculated by including the data of the oil temperature of the hydraulic oil supplied to the engine-disconnecting clutch 60 as the feature.

In the above embodiment, an example in which the information processing device is embodied as the data center 500 has been described. An example in which the index value is calculated in the data center 500 has been described. On the other hand, the information processing device described above may be embodied as the information processing terminal 600. In this case, the calculation of the index value is performed by the processing device 610 of the information processing terminal 600. The above-described information processing device may be embodied as the control device 70 of the vehicle 10. In this case, the calculation of the index value can also be performed by the control device 70 of the vehicle 10.

In the above-described embodiment, an example has been described in which one piece of extracted data is extracted and an index value is calculated. On the other hand, a final index value may be determined by extracting a plurality of pieces of extracted data and using a plurality of index values calculated using the respective pieces of extracted data. For example, the minimum value, the maximum value, the mode value, and the average value are set as final index values. Further, a plurality of index values may be output.

In the above-described embodiment, an example has been described in which, when the index value is equal to or larger than a predetermined value, it is notified that the occurrence of a failure has been predicted. This may be omitted. After the index value is calculated, only S190 process may be performed, and only the index value may be outputted.

Although the degree of damage is exemplified as an example of the index value to be calculated, the index value to be calculated is not limited to the degree of damage.

The processing device 510 sets a plurality of time windows such that a difference between the proportion of each cluster in the original data and the proportion of each cluster in the extracted data is equal to or smaller than a threshold value. Without such a restriction, the processing device 510 may set a plurality of time windows. In such cases, the process S110 clustering may be omitted.

The method of determining the setting of the time window in the clipping pattern may not be random. The trial may be repeated by changing the setting of the time window in the clipping pattern according to a preset rule.

The error calculated in S145 process is not limited to the mean absolute error MAE. For example, the processing device 510 may calculate a mean square error as an error. The processing device 510 may calculate a root mean square error as an error.

An example using extracted data obtained by combining all clipped data is shown. On the other hand, some of the clipped data may be combined to create extracted data.

What is claimed is:

1. An information processing device that acquires original data collected and created over a predetermined period using a plurality of sensors mounted on a vehicle and calculates an index value indicating a magnitude of damage accumulated in an engine-disconnecting clutch, the information processing device comprising a processing device configured to perform a process, wherein:

the original data includes, as features, the number of engagements of the engine-disconnecting clutch and a relative rotational speed between an input shaft and an output shaft of the engine-disconnecting clutch when the engine-disconnecting clutch is engaged;

the processing device is configured to perform a search process, the search process including a first step of calculating, for each of the features included in the original data, a relative frequency distribution in the original data, a second step of setting a plurality of time windows for clipping data of a partial period of the original data in such a manner that a sum of periods of all the time windows is shorter than the predetermined period, a third step of clipping data from the original data according to the time windows, a fourth step of calculating, for each of the features, the relative frequency distribution in extracted data obtained by combining all the data clipped according to the time windows, and a fifth step of calculating an error between the relative frequency distribution in the original data and the relative frequency distribution in the extracted data, and after the first step is performed, a trial from the second step to the fifth step being repeatedly performed by changing settings of the time windows, and the processing device performing the search process to extract the extracted data with the error equal to or less than a threshold value; and the processing device is configured to calculate the index value using the extracted data with the error equal to or less than the threshold value.

2. The information processing device according to claim 1, wherein the original data includes, as a feature, data on inertia of an engine that outputs a rotational force to the engine-disconnecting clutch.

3. The information processing device according to claim 1, wherein:

the processing device is configured to perform clustering, the clustering being machine learning that groups data of each interval obtained by dividing the original data into intervals of a certain period into a predetermined number of clusters; and the processing device is configured to set, in the second step, the time windows in such a manner that a difference between a proportion of each of the clusters in the extracted data and a proportion of each of the clusters in an entirety of the original data is equal to or less than a threshold value.

4. The information processing device according to claim 1, wherein the processing device is configured to end the search process when one piece of the extracted data with the error equal to or less than the threshold value is extracted, and calculate the index value using the piece of the extracted data with the error equal to or less than the threshold value.

5. The information processing device according to claim 1, wherein the processing device is configured to, when the calculated index value is equal to or greater than a predetermined value, notify that a failure is predicted to occur.

* * * * *